Aug. 3, 1954  D. A. CUSANO ET AL  2,685,530
METHOD OF PREPARING TRANSPARENT LUMINESCENT SCREENS
Filed Aug. 1, 1952
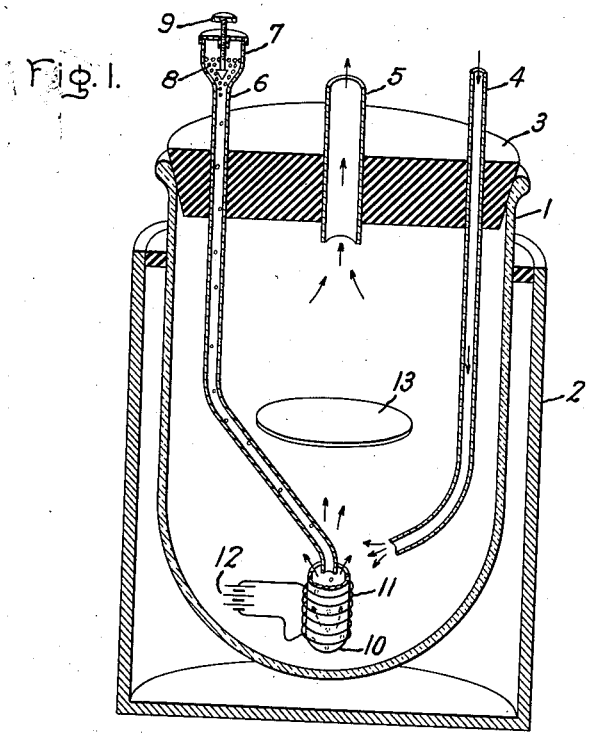
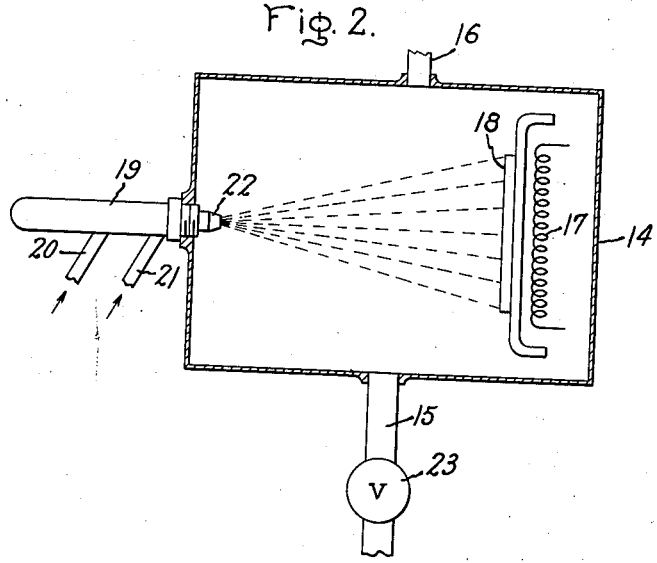
Inventors:
Dominic A. Cusano,
Frank J. Studer,
by Paul A. Frank
Their Attorney.

Patented Aug. 3, 1954

2,685,530

UNITED STATES PATENT OFFICE 2,685,530

METHOD OF PREPARING TRANSPARENT LUMINESCENT SCREENS

Dominic A. Cusano and Frank J. Studer, Schenectady, N. Y., assignors to General Electric Company, a corporation of New York Application August 1, 1952, Serial No. 302,224

15 Claims. (Cl. 117—33.5)

This invention comprises a method of making luminescent screens which are continuous and transparent. The present application is a continuation-in-part of our application Serial No. 200,908, filed December 15, 1950.

Heretofore, luminescent screens such as those used in cathode ray tubes were formed directly on the glass viewing face and consist of fine grains or particles of luminescent material. Aside from the fact that such screens are difficult to make, they are subject to a number of deficiencies in actual use. While these deficiencies are present in all such cathode ray tube screens, they are particularly bothersome in the case of television viewing tubes.

One of the disadvantages of normal powder base luminescent screens is their tendency toward halation under excitation. When a cathode ray or electron beam strikes the phosphor or luminescent layer, a certain amount of the light which is excited proceeds directly through the viewing face to the eye of the observer. However, some of the light is diffusely scattered by the phosphor particles within the screen to illuminate adjacent unexcited particles. Some of the light produced in the screen is also reflected at various angles from the near and far surfaces of the glass viewing face back into the screen to illuminate unexcited areas. The net result is a halo around the excited spot in the screen which detracts from the resolution and contrast of the image produced.

Added to the above effect is that produced by light outside the tube, since under normal circumstances it is not kept in complete darkness. Outside light incident on the tube passes through the viewing face to the luminescent particles and is scattered among them as well as back through the viewing face, a portion of the latter light being reflected back into the phosphor layer from the surfaces of the face plate. The net result of the above phenomena is a general gray appearance of the screen even before any excitation and a diminution of the contrast and definition of any image produced under excitation. The darkest parts of the image can never be any darker than the general gray cast resulting from the light scattering. The effect is similar to that which obtains when a lantern slide image is projected upon a previously illuminated screen.

The importance of the problem of scattered light in cathode ray tube screens is manifested by the means which were utilized to reduce its effect by even a small fraction. One such means consists in making the tube face plate or viewing face of darkened glass which absorbs some thirty per cent of the light normally passing through the face. While there is a diminution of the scattered light effect, there is a corresponding decrease in brightness. Another method of reducing the scattered light effect involves the admixture of inert black powders with the luminescent material of the screen. While the black particles are useful in blocking off some scattered light rays, again they detract from the brightness of the image produced.

As a result of the method of this invention luminescent screens are provided which are characterized by negligible halation and light-scattering effects.

An object of this invention is to provide luminescent screens which are continuous rather than particulate in nature.

A further object of the invention is to provide useful luminescent screens which are in the form of continuous, transparent films.

Other objects will become apparent and the invention better understood from a consideration of the following description and the drawing. Fig. 1 shows partly in section an apparatus for forming luminescent screens of this invention, and Fig. 2 illustrates a modified apparatus also suitable for this purpose.

As a consequence of the present invention useful, continuous, film-like, transparent, luminescent screens characterized by decreased halation may be very readily fabricated.

More particularly, it has been found that such useful screens may be prepared by reacting in the vapor phase such materials as zinc, cadmium, or mixtures of these materials or the halides thereof with hydrogen sulfide or selenide in the presence of an activator.

The new, transparent, luminescent screens are to be distinguished from the maganese activated zinc fluoride screen described by F. E. Williams, "Journal of the American Optical Society," 37, 4, 306 (1947). While this zinc fluoride screen luminesced under cathode ray bombardment, it exhibited a marked tendency to burn and lost its efficiency under sustained cathode ray bombardment such as is experienced, for example, in a cathode ray tube. On the other hand, the screens of the present invention maintain their brightness and efficiency under continuous cathode ray bombardment as well as under 3650 Å, 2537 Å, and other excitation. The new screens are also to be distinguished from thick screens which are cast from fused material.

The apparatus for carrying out the method of the present invention may be varied in structure. In the apparatus shown in Fig. 1 the treating chamber 1 is placed in an oven 2 heated by a source not shown. Alternatively, the chamber 1 may be wrapped with resistance heating wire or other means utilized to heat it to the desired temperature, such means being well known in the art. The upper open end of chamber 1 is sealed with a stopper or plug 3 having holes therein for the passage of gas supply tube 4, evacuation tube 5, and solid material introducing tube or conduit 6. Conduit 6 has a compartment 7 for the storage of material 8 at its upper end as well as a valve device 9 to control the flow of material down the tube. Toward the lower end of chamber 1 is located a receptacle or container 10 to receive material from conduit 6. Container 10, as well as other exposed parts, is typically of Alundum, quartz, or other material which will not react with the materials used. In order that the material or materials in container 10 may be vaporized, the latter is heated externally as by electrical resistance wire 11. A battery 12 is symbolic of a suitable source of electric energy for heating the resistance 11. The plate 13 or other object to be coated is placed above container 10 and the lower end of tube 4.

In operation the oven 2 or other heating means for the chamber 1 is energized to raise the temperature of plate 13 to from about 400° C. to 600° C. and preferably from 550° C. to 600° C. The temperature should be sufficiently high to cause the chemical reaction of such portions of the gaseous dispersion which comes into contact with the heated base member but should be below the temperature of volatilization of the resulting product.

Container 10 is heated to a temperature at which sufficient vaporization of the substance used occurs to furnish sufficient vapor for the present purpose. The valve 9 opened to allow material 8 to drop by gravity into container 10 where it is vaporized and rises upward. At the same time, either gaseous hydrogen sulfide or gaseous hydrogen selenide, is introduced through tube 4, the lower end of which is so located, as shown, that the gas intermingles and mixes with the vapors of the material 8 to form a gaseous dispersion in which reaction occurs at the surface of the plate 13 to form a product which is condensed, and deposited as a continuous, transparent, luminescent film on the plate 13. The chamber is continually evacuated through tube 5. A particular advantage of the above-described method of feeding the solid material into crucible 10 during the reaction is that, in a mixture of two or more materials, one of which may be more volatile than the other, the vapors above the container reacting with the gas from tube 4 will always contain some of each material. This is to be contrasted to the situation where the entire charge of solid material is placed in a container and heated, in which case the more volatile material escapes first making the outer part of the film deficient in that material.

While the above-described apparatus is the preferred embodiment of that used in carrying out the present invention, the process may be practiced utilizing modified apparatus without detracting appreciably from the quality and characteristics of the final structure produced thereby. For example, in Fig. 2 is shown a modification in which reacting ingredients are introduced as a spray.

Referring again to Fig. 1, zinc chloride is introduced into container 10 which is maintained at a temperature sufficiently high to vaporize the required amount of zinc chloride, ordinarily 500° C. being adequate. The glass plate or other surface to be coated corresponding to plate 13 of the drawing is heated to a temperature of 400° C. to 600° C. and preferably from 550° C. to 600° C. At the same time a stream of hydrogen sulfide is introduced into the treating chamber as through conduit 4, the chamber being evacuated through conduit 5. As the vapors of the zinc chloride rise upward toward the plate to be coated, they intermingle with the hydrogen sulfide and react therewith, producing on the plate a continuous, transparent film which upon analysis is shown to be ZnS:Zn. The film is made in any thickness desired simply by varying the time of treatment. (In actual use films having a thickness of from $.5\mu$ to $1\mu$ have been found most useful, though there is no limit in this respect.) The film luminesces efficiently under cathode ray, and to some extent under 3650 Å. and 2537 Å. excitation.

Zinc sulfide luminescent material containing other activators may be prepared in a similar manner. For example, if a copper-activated zinc sulfide is desired copper chloride or another copper compound such as copper sulfate is mixed with zinc chloride and the mixture heated to vaporization, the zinc chloride and hydrogen sulfide reacting to form a luminescent, transparent, zinc sulfide film activated with copper. Alternatively, the activator may be vaporized in a separate heated container.

A large number of activators including manganese, silver, copper, zinc, and aluminum, among others, are capable of being incorporated in the zinc, cadmium, and zinc-cadmium sulfide and selenide systems to yield transparent, luminescent deposits or films. The activating materials are introduced in the form of the elements themselves or their salts.

In addition to zinc chloride, zinc bromide is suitable as a starting material with the same activators, the final phosphor having the same composition as above.

Another alternative method of preparing the new phosphors is to vaporize zinc metal as such in lieu of the halide along with the desired separate activator or alone, and react the composite vapor with $H_2S$ to produce the activated sulfide which is deposited on the glass plate or other non-corrosive base material.

Cadmium sulfide phosphors are prepared in the same manner as those of zinc, the only deviation being to adjust the temperature of the vaporizing receptacle to such degree as will evaporate the particular substance employed. Activators conveniently used with cadmium sulfide are copper, silver, manganese, and aluminum.

As illustrative of the preparation of the cadmium sulfide phosphor, cadmium chloride is vaporized, its vapors mixed with those of hydrogen sulfide and the CdS:Cd reaction product allowed to deposit on a glass or other plate held at 400° C. to 600° C. and preferably at from 550° C. to 600° C.

Likewise, cadmium chloride or bromide and a salt of an activating material, or the element itself, such as those listed above are vaporized in admixture or separately, allowed to react with hydrogen sulfide and to deposit on a base plate held at temperatures as above. Similarly, cadmium metal may be used in lieu of the salt.

Zinc-cadmium sulfide phosphors are prepared in the same manner as the zinc and cadmium sulfides, the zinc and cadmium-containing raw materials being mixed in desired proportions.

When hydrogen selenide is utilized instead of hydrogen sulfide, a series of selenide phosphors is obtained, no other raw material or processing conditions being altered. In every case the final product is in the form of a transparent and continuous film which luminesces under cathode ray as well as to some extent under 3650 Å. and 2537 Å. excitation.

It is to be understood, of course, that the pure metals and salts of metals disclosed herein may be used in admixture in preparing the new luminescent screens.

The apparatus illustrated by Fig. 2 comprises an enclosure 14 consisting of iron or other suitable material. Valved inlet and outlet conduits 15 and 16 are provided. Within this enclosure is a foundation 18 of glass, fused quartz, or other suitable transparent material which is heated by any suitable means such as electric resistor 17 to a high temperature in the range of about 400 to 600° C. and preferably in the range of 550 to 600° C. Within the container is an atmosphere of hydrogen sulfide or selenide at a pressure of a few millimeters of mercury or lower. Opposite the plate 18 is a spray 19 having inlet tubes 20 and 21 and a nozzle 22. A solution of a salt of zinc or cadmium or a mixture of zinc and cadmium (for example, the chlorides of $ZnCl_2.CdCl_2$) in a suitable solvent, as for example, ethyl alcohol, is supplied by a conduit 21 to the spray. A suitable activator (as for example copper bromide also is present in the solvent in appropriate amount such as one or two per cent. A gas under pressure such as helium, is supplied by the conduit 20. This gas entrains and atomizes some of the solution of zinc or cadmium chloride. With the valve 23 closed, evacuation of gas through the conduit 16 maintains the preferred low pressure in the reaction space within the enclosure 14. When the spray of alcoholic solution strikes the hot plate 18 the solvent is evaporated and by chemical reaction between the hydrogen sulfide and the particles of zinc or cadmium salt or mixtures thereof, a transparent, activated coating of the resulting sulfide compound is formed on the base 18. Such coating emits light by luminescence when energized by cathode rays. In some cases the enclosure 14 may be omitted, the process then being carried out in the open air. In that case the gas for atomizing the solution of film-forming material which is admitted to the spray through the conduit 20 may be hydrogen sulfide, or if desired hydrogen selenide. Care must be exercised to avoid ignition of the hydrogen sulfide in the presence of atmospheric oxygen and contact with the heated plate 18.

It will be seen that by the present invention, there are provided activated zinc, cadmium, and zinc-cadmium sulfide and selenide luminescent materials which may be obtained in the form of continuous, transparent films. These luminescent films are further activated with various material to obtain different colored emissions. By blending discrete films of various colors or by preparing a single film with a selection of activators, all colors, as well as white emission, may be attained.

The transparent, luminescent films, made by the methods herein described, are particularly characterized by a lack of the halation effect and light scattering encountered in the use of particulate luminescent screens. When the present screens are excited, the absence of the halo effect and light scattering makes possible greater contrast between excited and unexcited areas. The new transparent screens are further characterized by the absence of background illumination such as occurs when room light incident upon ordinary screen is scattered among the particles thereof.

While the luminescent screens described herein are particularly useful in television receiver cathode ray tubes, they have utility in any case where high contrast and fidelity are required in images produced on a luminescent screen. They are of great value in the study of electron penetration and scattering effects.

What we claim as new and desire to secure by Letters Patent of the United States is:

1. The method of making a transparent luminescent screen which comprises heating a base of transparent vitreous material to a temperature in the range of about 400 to 600° C. and introducing and in contact with said heated member a dispersion of the following ingredients: (1) a material selected from the class consisting of zinc, cadmium, zinc salt and cadmium salt, and mixtures thereof (2) a luminescence activator, and (3) a material selected from the class consisting of hydrogen sulfide, hydrogen selenide and mixtures thereof whereby chemical reaction occurs and a desired transparent screen is deposited on said base member.

2. The method of making a transparent luminescent screen which comprises evaporating an activator and a material selected from the class consisting of zinc, cadmium, zinc salts, cadmium salts, and mixtures thereof, reacting the vapor with a material selected from the class consisting of hydrogen sulfide and hydrogen selenide, and depositing the reaction product on a base heated to a temperature of 400° C. to 600° C. in the form of a transparent film.

3. The method of making a transparent luminescent screen which comprises evaporating an activator and zinc, reacting the vapor with hydrogen sulfide, and depositing the reaction product in the form of a transparent film on the base heated to a temperature in the range of 400 to 600° C.

4. The method of making a transparent luminescent screen which comprises evaporating an activator and cadmium, reacting the vapor with hydrogen sulfide, and depositing the reaction product in the form of a transparent film on a base heated to a temperature in the range of 400 to 600° C.

5. The method of making a transparent luminescent screen which comprises evaporating an activator and a mixture of zinc and cadmium, reacting the vapor with hydrogen sulfide, an depositing the reaction product on a heated base in the form of a transparent film.

6. The method of making a transparent luminescent screen which comprises evaporating an activator and zinc salt, reacting the vapor with hydrogen sulfide, and depositing the reaction product on a heated base in the form of a transparent film.

7. The method of making a transparent luminescent screen which comprises evaporating an activator and cadmium salt, reacting the vapor with hydrogen sulfide, and depositing the reaction product on a heated base in the form of a transparent film.

8. The method of making a transparent luminescent screen which comprises evaporating an activator and a mixture of zinc and cadmium salts, reacting the vapor with hydrogen sulfide, and depositing the reaction product on a heated base in the form of a transparent film.

9. The method of making a transparent luminescent screen which comprises evaporating an activator and zinc, reacting the vapor with hydrogen selenide, and depositing the reaction product on a heated base in the form of a transparent film.

10. The method of making a transparent luminescent screen which comprises evaporating an activator and cadmium, reacting the vapor with hydrogen selenide, and depositing the reaction product on a heated base in the form of a transparent film.

11. The method of making a transparent luminescent screen which comprises evaporating an activator and a mixture of zinc and cadmium, reacting the vapor with hydrogen selenide, and depositing the reaction product on a heated base in the form of a transparent film.

12. The method of making a transparent luminescent screen which comprises evaporating an activator and zinc salt, reacting the vapor with hydrogen selenide, and depositing the reaction product on a heated base in the form of a transparent film.

13. The method of making a transparent luminescent screen which comprises evaporating an activator and cadmium salt, reacting the vapor with hydrogen selenide, and depositing the reaction product on a heated base in the form of a transparent film.

14. The method of making a transparent luminescent screen which comprises evaporating an activator and a mixture of zinc and cadmium salts, reacting the vapor with hydrogen selenide, and depositing the reaction product on a heated base in the form of a transparent film.

15. The method of producing a transparent luminescent coating on a base member which consists in heating said base member to a temperature in the range of about 400 to 600° C., spraying into contact with said heated member a solution in a volatile solvent of a compound of the class consisting of zinc compounds and cadmium compounds together with an appropriate activator in the presence of a gas chosen from the class consisting of hydrogen sulfide, hydrogen selenide and mixtures thereof whereby a reaction product is formed and deposited on said heated base as a transparent film.

References Cited in the file of this patent

UNITED STATES PATENTS

| Number | Name | Date |
|---|---|---|
| 2,161,458 | Boer et al. | June 6, 1939 |
| 2,280,939 | Weinhart | Apr. 28, 1942 |
| 2,462,517 | Leverenz | Feb. 22, 1949 |
| 2,600,579 | Ruedy et al. | June 17, 1952 |